United States Patent [19]

Lee, II

[11] Patent Number: 4,491,156

[45] Date of Patent: Jan. 1, 1985

[54] MULTIPLE WAY PINCH VALVE

[75] Inventor: Leighton Lee, II, Guilford, Conn.

[73] Assignee: The Lee Company, Westbrook, Conn.

[21] Appl. No.: 417,686

[22] Filed: Sep. 13, 1982

[51] Int. Cl.³ .............................................. F16K 7/06
[52] U.S. Cl. ................................. 137/870; 137/595; 137/863; 251/7
[58] Field of Search ............... 137/595, 607, 863, 870, 137/636; 251/7, 9

[56] References Cited

U.S. PATENT DOCUMENTS

| 2,556,689 | 6/1951 | Grove | 137/863 |
| 2,624,364 | 1/1953 | Setlefsoy | 251/7 X |
| 2,645,245 | 7/1953 | Maisch | 137/863 X |
| 3,075,551 | 1/1963 | Smith et al. | 137/863 X |
| 3,213,882 | 10/1965 | Beatty | 137/595 |
| 3,726,311 | 4/1973 | Ishihara et al. | 137/596.17 |
| 3,895,649 | 7/1975 | Ellis | 137/595 |
| 4,078,583 | 3/1978 | Raghavachari et al. | 137/636 |
| 4,230,151 | 10/1980 | Jinssoy | 137/863 X |
| 4,259,985 | 4/1981 | Bergmann | 137/870 X |
| 4,372,345 | 2/1983 | Mehus | 137/636 |

Primary Examiner—Gerald A. Michalsky
Assistant Examiner—John C. Fox
Attorney, Agent, or Firm—Prutzman, Kalb, Chilton & Alix

[57] ABSTRACT

A miniature electromagnetic valve having a valve mechanism with three spaced parallel rods, a pair of generally semi-circular, resilient conductor tubes extending between the rods and a linear solenoid for selectively shifting the intermediate rod for selectively and individually pinching the tubes closed.

7 Claims, 3 Drawing Figures

MULTIPLE WAY PINCH VALVE

DESCRIPTION

1. Field of Invention

The present invention relates generally to fluid valves and more particularly to a new and improved fluid valve especially suited for handling chemically active fluids. More specifically, the present invention in its preferred embodiment relates to a new and improved miniature, electromagnetically operated valve useful in a bank of such valves for precisely mixing chemicals for example for medical and pharmaceutical applications.

2. Summary of Invention

A principal object of the present invention is to provide in a fluid valve a new and improved fluid flow control system employing one or more resilient flow tubes in combination with a tube pinch mechanism for selectively controlling fluid flow through the valve.

It is another object of the present invention to provide an improved solenoid operated 3-way valve incorporating a pair of resilient flow tubes and a tube pinch mechanism for alternately closing and opening the tubes to control fluid flow.

Another object of the present invention is to provide a new and improved miniature solenoid operated valve useful with chemically active fluids and designed to prevent leakage of and chemical reaction with such fluids.

It is another object of the present invention to provide an improved electromagnetically operated valve adapted for selectively metering small amounts of liquid.

It is a further object of the present invention to provide a new and improved miniature solenoid operated valve which is especially suited for medical and pharmaceutical applications.

The preferred embodiment of the fluid valve of the present invention comprises a valve housing base with separate fluid entrance and exit passages, one or more resilient conductor tubes connecting the entrance and exit passages, and a valve operator for selectively pinching the resilient conductor tubes to control the flow of fluid through the valve. Preferably, the valve operator embodies an improved tube pinch mechanism having a set of pinch elements selectively operable by a solenoid to selectively open and close each resilient tube.

Preferably, the invention is embodied in a 3-way valve comprising a valve housing base provided with an entrance passage and two separate exit passages and two separate resilient conductor tubes connecting the entrance passage to the exit passages. A plurality of pinch elements are provided with each of the tubes being located between an intermediate pinch element and another pinch element, and a solenoid is provided for selectively shifting the intermediate pinch element for individually and alternately closing the tubes.

BRIEF DESCRIPTION OF DRAWINGS

The accompanying drawings illustrate a preferred embodiment of the present invention and together with the following description serve to disclose the principles and operation of the present invention.

In the drawings.

DETAILED DESCRIPTION OF PREFERRED EMBODIMENT

Figure 1:
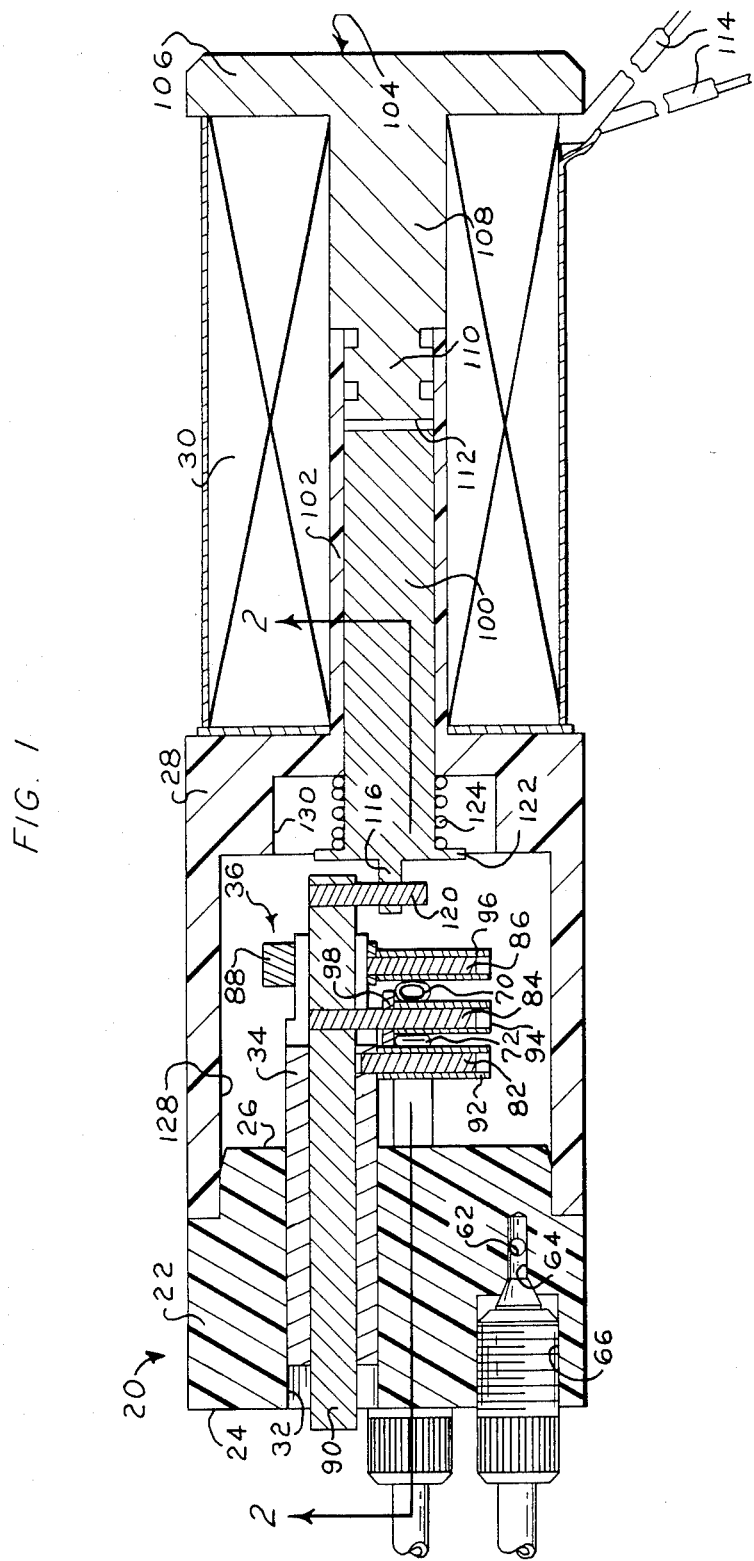
FIG. 1 is a longitudinal section view, partly broken away and partly in section, of a fluid valve incorporating a preferred embodiment of the present invention.

Referring now to the drawings in detail, a fluid valve 20 incorporating a preferred embodiment of the present invention comprises a housing with a generally cylindrical housing body or base 22 having flat, parallel outer and inner end faces 24 and 26. A case or cover 28 of the housing has a front cylindrical housing section coaxially mounted on an inner reduced end of the base 22 and a reduced, coaxial, rearwardly projecting cylindrical section or tube 102. A rear coil assembly 30 of a valve operating solenoid of the valve is mounted on the rear tube 102. The base 22 is made of a suitable chemically inert plastic such as that sold by Dupont Corporation under the trademark "Kel-F". The case 28 is preferably made of aluminum.

The base 22 has a cylindrical bore or opening 32 extending axially through the base 22 from its outer face 24 to its inner face 26. A cylindrical sleeve 34 is press fit within the axial bore 32 to extend into the cavity provided by the front cylindrical section of the case 28 and serves as a support for a linear valve operator mechanism 36.

The fluid valve 20 which is shown is a 3-way valve. The base 22 includes a fluid entrance passage comprising an enlarged inlet passage 38 connected by intersecting axial and transverse passages 40 and 42 to a pair of axially extending outlet passages 44 and 46. Axial passages 38, 40, 44 and 46 are formed by axial bores drilled into the base 22, and transverse passage 42 is formed by a cross bore drilled into the base to intersect passages 40, 44 and 46. A plug 48 is inserted into the outer end of transverse passage 40 to seal against fluid leakage. Axial passages 44 and 46 have enlarged counterbores at the inner face 26 of the base 22, and a pair of tubular connectors 50, 52 are press fit within the counterbores to form outlet connectors for the two entrance passages.

The housing base 22 has a first exit passage comprising an axial passage 54 (FIG. 2) extending from the inner face 26 of the base 22 to an enlarged outlet 56 at the outer face 24 of the base 22. The axial passages 54 and 56 are formed by bores drilled in the base 22. The inner end of the passage 54 has an enlarged counterbore for receiving a press fit tubular connector 58 which serves as an inlet connector for the first exit passage. The base 22 has a second exit passage comprising an axial passage 60 (FIG. 2) extending from the inner face 26 of the valve body and connected by a lateral passage 62 to another axial passage 64 (FIG. 1) connected to an enlarged outlet 66 at the outer face 24 of the base 22. Axial passages 60, 64 and 66 and the transverse passage 62 are formed by drilling the housing base 22. As shown in FIG. 2, the passage 60 includes an enlarged counterbore at the inner face 26 of the base 22 for receiving a press fit tubular connector 68 which serves as an inlet connector for the second exit passage.

Figure 3:
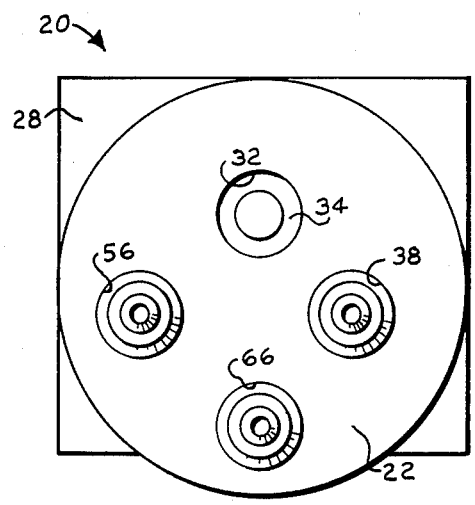
FIG. 3 is a front end view of the fluid valve.

The inlet 38 and outlets 56 and 66 are enlarged threaded bores adapted to receive suitable threaded connectors to provide fluid communication with the valve. As shown in FIG. 3, the inlet 38 and outlet 56 are located in an axial plane slightly offset from the centerline of the valve base. The outer outlet 66 is generally centered between the inlet 38 and outlet 56 radially outwardly of the common axial plane of the inlet 38 and outlet 56. The bore 32 for the sleeve 34 is generally centered between the inlet 38 and outlet 56 on the opposite side of said plane from the outlet 66.

Referring to FIG. 2, a pair of flexible and resilient tubes 70 and 72 are mounted on the tubular connectors for connecting the two entrance passage outlets to the two exit passage inlets. The flexible tubes 70 and 72 are preferably made of a suitable chemically inert plastic (for example such as that sold by DuPont Corporation under the trademark Kal-Rez) to provide resistance to toxic and other chemically active substances. The ends of the tube 70 are clamped onto the tubular connectors 50 and 58 by a pair of collars 74 and 76 respectively. Similarly, the ends of the tube 72 are clamped onto the tubular connectors 52 and 68 by a pair of collars 78 and 80 respectively. The connectors 50, 58, 52 and 68 are in spaced parallel alignment and the lengths of the two tubes 70 and 72 are selected so that the two tubes are mounted to be substantially parallel (i.e. generally concentric) and to form slightly flattened semi-circular flow paths within a common plane.

Figure 2:
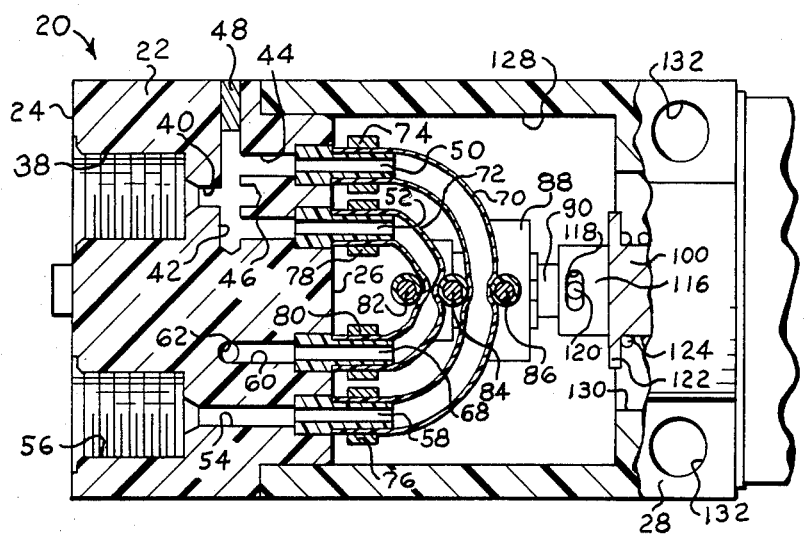
FIG. 2 is a partial longitudinal section view, partly broken away and partly in section, of the fluid valve taken substantially along line 2—2 of FIG. 1.

Referring to FIG. 1, the valve operator mechanisnm 36 comprises a set of three cylindrical pinch rods or elements 82, 84 and 86. The pinch rods 82, 84 and 86 extend diametrically within the valve case in a common axial plane, parallel to each other and normal to the common plane of the generally semi-circular tubes 70, 72. The inner pinch rod 82 is firmly mounted within a radial bore in the mounting sleeve 34 and extends laterally from the sleeve 34 within and in engagement with the inner edge of the inner flexible tube 72. The outer pinch rod 86 is firmly mounted on a reduced outer end of the mounting sleeve 34 by an axially adjustable clamp 88 and extends radially from the sleeve 34 parallel to the inner rod 82 and in engagement with the outer edge of the outer flexible tube 70. The intermediate pinch element 84 is firmly mounted within a radial bore in a cylindrical plunger or push rod 90 supported by the sleeve 34 for linear movement. The intermediate pinch element 84 extends laterally outwardly through an axial slot in the reduced inner end of the sleeve 34 parallel to and between the rods 82 and 86 and also between the two tubes 70 and 72. The axial slot in the support sleeve 34 guides the intermediate rod 84 to maintain it in angular alignment with the pinch rods 82 and 86. The intermediate pinch rod 84 engages the inner edge of the outer flexible tube 70 and the outer edge of the inner flexible tube 72.

The inner resilient tube 72 is partly collapsed or squeezed by the inner pinch rod 82, and the outer resilient tube 70 is partly collapsed or squeezed by the outer pinch rod 86. The intermediate pinch rod 84 at an intermediate position thereof equidistant from the pinch rods 82, 86, partly squeezes or collapses each of the tubes 70, 72. The pinch rods 82, 84 and 86 have outer sleeves 92, 94 and 96 made for example of Teflon to protect the tubes 70, 72 against abrasion or other wear by the pinch rods. In addition, a circular washer 98 is press fit on the intermediate pinch rod 84 to provide a limit stop engageable with the inner and outer rods 82, 86 to limit the linear movement of the intermediate rod 84 in both directions. In each of the linear limit positions of the intermediate pinch rod 84, one of the tubes 70, 72 is squeezed or pinched sufficiently to close the tube and the other tube 70, 72 is released sufficiently to open the tube for fluid flow. However, in each limit position of the intermediate pinch rod 84, the open or released tube is still partly pinched or closed by the intermediate rod 84 and the other fixed rod 82 or 86 on its opposite side to minimize the required linear stroke of the valve actuator and to employ the resilience of the open tube in shifting the intermediate rod 84 in the opposite direction to pinch the other tube closed.

The valve operator mechanism 36 is coupled to a linear armature 100 to be operated by the solenoid coil 30. The armature 100 is mounted within the cylindrical tube 102 of the aluminum case 28 for linear axial movement on the valve axis. An end cap 104 having a citrcular flange 106 and a central cylindrical shank 108 is mounted within the outer end of the solenoid coil 30. An inner reduced end 110 of the cap is received within the outer end of the cylindrical tube 102, and an inner end face 112 of the end cap serves to limit the outward movement of the armature 100. The housing case 28, including the reduced axially projecting tube 102 and the end cap 104 provide a spool-like structure for supporting the solenoid coil or winding 30. Suitable electrical leads 114 are provided to energize the solenoid coil 30 and thereby magnetically shift the solenoid armature 100 outwardly, to the right as viewed in FIG. 1.

As shown in FIGS. 1 and 2, the armature 100 has at its inner end an axially projecting connector 116 with a transverse slot 118 for receiving a coupling pin 120 mounted within a cross bore at the inner end of the linear push rod 90. Also, the armature 100 has an annular flange 122 at its inner end which is engaged by a compression spring 124 interposed between an inner end face of the case and the armature flange to bias the armature 100 inwardly, to the left as viewed in FIG. 1.

The valve case 28 has a coaxial cylindrical bore 128 providing a hollow interior cavity for receiving the valve operating mechanism 36. The valve case 28 also has a reduced coaxial cylindrical bore 130 which provides a cavity for receiving the compression spring 124 and the annular flange 122 of the armature 100. A pair of parallel transverse bores 132 (FIG. 2) are provided in an intermediate square section of the housing case 28 for use in mounting the valve.

In the operation of the valve, the compression spring 124 normally holds the armature 100 at its inner or leftward position shown in FIG. 1. In that position, the intermediate pinch rod 84 is shifted to the left as viewed in FIG. 1 to pinch or compress the inner flexible tube 72 sufficiently to close the tube. The limit washer 98 establishes the extent of compression of the tube 72 to prevent tube damage. At the same time, the outer flexible tube 70, although partly compressed between the pinch rods 84 and 86, is open sufficiently to permit fluid flow through the tube. Thus, fluid is allowed to flow from the inlet 38 and through the open tube 70 to the outlet 56, while fluid flow through the tube 72 is prevented by virtue of the pinching or squeezing action provided by the pinch rods 82, 84. When it is desired to switch the valve, the solenoid coil 30 is energized to shift the armature 100 outwardly against the bias of the compression spring 124. As a result, the intermediate pinch rod 84 is shifted toward rod 86 to open the inner tube 72 and close the outer tube 70. The circular washer 98 limits the compression of the outer tube 70 in the same manner and for the same reason that it limits the compression of the inner tube 72. In that mode of valve operation, fluid is free to flow from the inlet 38 through the inner tube 72 to the outlet 66 and the outer tube 70 is closed.

When the solenoid coil 30 is deenergized, the armature 100 is shifted by the compression spring 124 back to the position shown in FIG. 1 where it closes the tube 72 and where the tube 70 is released sufficiently to open for fluid flow.

The linear push rod 90 also serves as a visual indicator and manual override. With the valve operating mechanism 36 in its normal position, i.e., with the solenoid coil 30 deenergized, the push rod 90 projects outwardly from the outer face 24 of the base 22. When the solenoid coil 30 is energized, the push rod 90 is drawn inwardly into the base 22. Therefore, the position of the outer end of the push rod 90 relative to the outer face 24 of the base indicates the state of operation of the valve. Moreover, with the valve operating mechanism 36 in its deenergized position, the rod 90 can be manually depressed to switch the valve to its alternative mode of operation.

The valve of the present invention is especially well adapted for medical and pharmaceutical uses and for handling toxic and other chemically active substances. The flexible tubes 70 and 72 and the base 22 and tube connectors 50, 52, 58 and 68 are made of suitable inert or anti-corrosive materials to prevent corrosion or other chemical reaction with the fluids being handled. Moreover, the valve is particularly suitable for installations which require miniaturization. For example, the overall length of a preferred embodiment of the valve 20, including the base 22, case 28, cap 104 and the solenoid coil 30 is approximately 2.210 inches, and the diameter of the cylindrical section of the valve case 28 is approximately 0.666 inches.

A simple modification of the preferred embodiment allows the valve 20 to operate as a 2-way valve. For example, a threaded plug (not shown) may be inserted into one of the valve outlets 56 or 66 to block fluid flow from the corresponding valve exit passage. Also, depending on which outlet 56 or 66 is plugged, the valve can be configured as either a normally open or normally closed 2-way valve. Alternatively, the valve assembly may be specifically designed to incorporate only a single flexible tube and two pinch rods to open and close the tube.

As will be apparent to persons skilled in the art, various modifications, adaptations and variations of the foregoing specific disclosure can be made without departing from the teachings of the present invention.

I claim:

1. A valve for controlling the flow of fluid therethrough, comprising an elongated valve housing having a valve body at one longitudinal end thereof provided with a longitudinally extending entrance passage having an inlet at an outer face of said valve body and two separate outlets at an inner face thereof, said valve body including two separate, non-intersecting exit passages, each having an inlet at the inner face of said valve body and an outlet at the outer face thereof, the valve housing having a case with an open end receiving the inner face of said valve body, a pair of resilient tubes connecting said outlets of said entrance passage to said inlets of said exit passages, said tubes being arranged in juxtaposition within said valve case, a set of aligned pinch elements mounted within said case with one of the resilient tubes being located between first and second pinch elements and the other resilient tube being located between said second and third pinch elements, said first and third pinch elements being fixed and said second pinch element being shiftable relative to said first and third pinch elements to selectively pinch said tubes closed to the flow of fluid therethrough, and actuator means mounted on the valve housing for selectively shifting said second pinch element toward said first and third pinch elements to close one of said resilient tubes and open the other tube to control the fluid flow from said entrance passage to said exit passages.

2. The valve of claim 1, wherein said actuator means comprises a solenoid mounted on the opposite end of said elongated housing from said base and having a linear armature longitudinally shiftable within said housing and coupled to said second pinch element for shifting said second pinch element relative to said first and third pinch elements.

3. The valve of claim 2, wherein the valve body has an opening extending longitudinally therethrough from its inner face to its outer face and a fixed sleeve mounted within said opening and extending into said case, said first and third pinch elements being mounted on said sleeve, and wherein the actuator means comprises a linear plunger slidable within said sleeve and extending into said case, said second pinch element being mounted on said plunger, and said plunger being connected to said armature to shift said second pinch element with said solenoid.

4. The valve of claim 1, 2 or 3, wherein the actuator means comprises means for biasing said second pinch element toward one of the other pinch elements to normally close the tube located therebetween and to normally open the other tube.

5. The valve of claim 3, wherein the outer end of said plunger extends longitudinally outwardly of said outer face of said valve body.

6. The valve of claim 1, 2, or 3 wherein said first resilient tube is normally compressed together between said first and second pinch elements to preclude fluid flow therethrough and said second resilient tube is partially compressed by said second and third pinch elements to permit fluid flow therethrough.

7. The valve of claim 2, further comprising stop means for limiting the movement of said armature upon actuation of said solenoid.

* * * * *